United States Patent [19]

Gayot

[11] 3,759,187
[45] Sept. 18, 1973

[54] RAIL VEHICLE STEERING SYSTEM
[75] Inventor: Jean Gayot, Meudon, (Hauts de Seine), France
[73] Assignee: Engins Matra, Paris, France
[22] Filed: Nov. 2, 1970
[21] Appl. No.: 85,963

[52] U.S. Cl. .................................. 104/130, 104/18
[51] Int. Cl. ........................ B61b 13/00, E01b 25/28
[58] Field of Search ......................... 104/18, 20, 130, 104/247; 105/215 R; 180/79 R; 213/75 R

[56] References Cited
UNITED STATES PATENTS
828,340   8/1906   Rice ........................................ 104/20
3,492,949   2/1970   Brown ................................. 104/244.1
3,643,600   2/1972   Bertin .................................... 104/130

Primary Examiner—Gerald M. Forlenza
Assistant Examiner—George H. Libman
Attorney—Thomas E. Dorn et al.

[57] ABSTRACT

This invention relates to an installation for continuous transport by trains made up of programmed (computer-controlled) vehicles, the installation comprising a main track serving stations via secondary tracks and having trains made up of at least one vehicle moving along the main track, the installation further being one wherein each vehicle is fitted with its own means for programming driving and braking, allowing the destination station to be selected and reached after extraction of the vehicles allocated for the station.

1 Claim, 15 Drawing Figures

RAIL VEHICLE STEERING SYSTEM

BACKGROUND OF THE INVENTION

This improvement relates to an installation of narrow width for the continuous transport of people or goods, by trains made up of programmed vehicles.

DESCRIPTION OF THE PRIOR ART

Continuous transport installations, on their own ground, comprising a conveying train and a loading train comparable in width to an ordinary Underground railway, are already known such being disclosed in U.S. Pat. application Ser. No. 84,729, filed Oct. 28, 1970. In these installations, the loading train, adjacent to the conveying train and moving along with it between stations, separates from it before entering stations in order to serve the latter, the conveying train continuing its journey without stopping in stations.

However, these installations, which have numerous advantages, were designed to provide large outputs, of the order of from 20,000 to over 50,000 passengers per hour for a passenger conveyor and several thousand tons per hour for a goods conveyor, and the resources they use are adapted to these outputs and would seem disproportioned for much smaller outputs.

SUMMARY OF THE INVENTION

The object of this invention is to cretae an installation for continuous transport by trains made up of programed vehicles, of narrow width, able, taking into consideration its great adaptability, to transport several hundred to several thousand passengers per hour or several tens to several hundred tons of goods per hour over distances of several hundred meters or several kilometers with multiple intermediary service points, in good conditions of speed, comfort and security for passengers, and at low initial cost.

An object of the invention is to create an installatIon combining an assignment for each vehicle with traffic administration providing trains at a set rate.

An object of the invention is to create an installation of narrow width, with great flexibility of vehicle allocation and traffic administration providing trains at a set rate to ensure an optimal output of passengers or goods for lower implementation costs than those required for standard installations.

Another object of the invention is to ease considerably the strain on auomatic apparatus and transmissions, a single information signal and a single control signal then being used for all vehicles making up the single train.

Another object of the invention is to ensure greater outputs, in particular for the very simple reason that the safety interval between two trains is not much greater than the safety interval between two detached vehicles.

Another object of the invention is to create a quick-acting switching system, more efficient than the switching device for moving tracks, such as railway switching devices.

Another object of the invention is to simplify automatic administrative devices and lastly, by using station computers, to lead to a lower total cost for these devices than that necessitated, in the case of a line administered by one central computer.

For this purpose, the present invention relates to an installation for continuous transport by trains made up of programmed vehicles of very narrow width, comprising a main track serving stations via secondary tracks and having trains made up of at least one vehicle moving along the main track, each vehicle being fitted with its own means for response to a control program, driving and braking, allowing the destination station to be selected and reached, the vehicles so allocated, which occupy any place whatsoever in the made-up train, separating from the train before arrival in the station and taking the secondary track to offload and pick up passengers or goods on a platform, along which track vehicles will possibly be made up into a secondary train rejoining the main track in order to attach itself in front of or behind one of the main trains following that from which the vheicleS separated, the vehicles remaining in the main train drawing closer together so as to remake a continuous main train after extraction of the vehicles allocated to the station.

In accordance with another characteristic, each vehicle is allocated to at least one destination station and may comprise means for displaying placards indicating the selected destinations for this vehicle, the main trains following each other at fixed intervals and each main train being able to rendezvous with a secondary train at each station exit.

Another important characteristic is that each vehicle is steered independently of the others only from the moment when it separates from a main train and at the maximum until the moment when it stops at a platform and, the rest of the time, it is subjected to steering in a made-up train, a single information signal and a single control signal sufficing for all the vehicles making up one train.

In accordance with one characteristic of the invention, each vehicle is allocated to one or more destination stations according to a pre-established program which may be modified only by the person responsible for administering the line.

In accordance with another characteristic of the invention the passengers themselves allocate each vehicle to one or more destination stations, by means of a control panel on each vehicle.

In accordance with another characteristic of the invention, each vehicle has a switching device on board, controllable up the line from the switch point so as to co-operate with steering components fixed to the track.

In this way, it is possible to extract without difficulty, from a train traveling at full speed, vehicles which will stop in the chosen station.

In accordance with a particular embodiment of the invention, the switching devices on board are mechanical, and steering of the vehicles is ensured by mechanical means on board combined with steering elements connected to the track.

In accordance with another particular embodiment of the invention, the steering and switching devices, or only part of them, are basically electro-magnetic.

When passengers are conveyed, the closing of doors between stations and their opening in stations is effected automatically.

When goods are conveyed, the loading of these goods into vehicles and unloading may be effected automatically.

In accordance with a particular embodiment of the invention this loading and unloading is carried out with the aid of remote-controlled roller tracks, some of which are on board the vehicles, while others are positioned on station platforms.

In a preferred embodiment of the invention, steering of made-up trains or detached vehicles is provided by a computer in each station, the information signals from trains and control signals sent to them being transmitted via a net-work conductor linked to the track.

Simple sub-programs may be superimposed, on board each vehcile, on the program laid down by the station computer, particularly in order to allow re-grouping of vehicles remaining in a made-up train after extraction of certain vehicles from it, or in order to ensure proper regrouping and stopping of vehicles arriving in a station.

BRIEF DESCRIPTION OF THE DRAWINGS

The novel features that are considered characteristic of this invention are set forth with particularity in the appended claims.

The invention itself, however, both as to its organization and its operation, together with additional objects and advantages thereof, will best be understood from the following descriptions of specific embodiments when read in connection with the accompanying drawings, wherein like reference characters indicate like parts throughout the several figures, and in which.

DESCRIPTION OF A PREFERRED EMBODIMENT

Figure 1A:
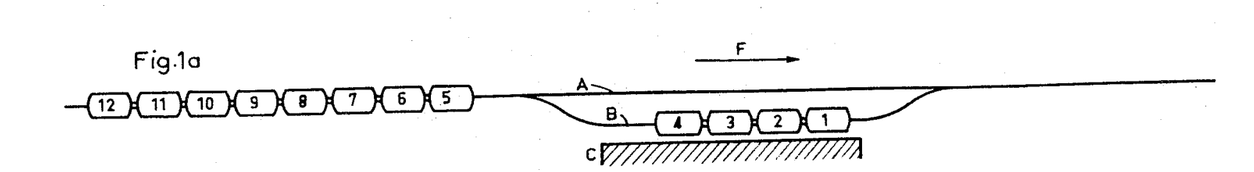
FIGS. 1a, 1b, 1c, 1d and 1e show the different stages of made-up train changes between the main track and a secondary track.
Figure 1B:
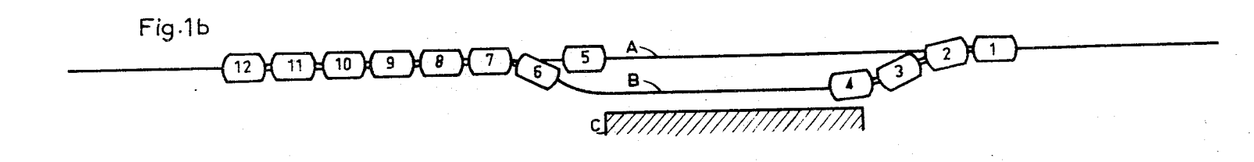

FIG. 1a shows diagrammatically a main track A having a turn-out into a secondary track B serving a station platform C. A secondary train, in this example made up of four vehicles, 1, 2, 3, 4 was stopped at platform C and has just set off in the direction of the arrow F. A main train, made up of eight vehicles, 5, 6, 7, 8, 9, 10, 11, 12, is moving along the main track towards the station. having FIG. 1b shows the position of the two trains a few moments later. Train (1, 2, 3, 4) has started moving along the line leaving the station part way through the turn-out into the main track, and train (5, 6, 7, 8, 9, 10, 11, 12) is entering the station. Vehicle 6 is in the turn-out process of shunting onto the secondary track, its links with vehicles 5 and 7 aving previously been discontinued.

Figures 1C, 1D:
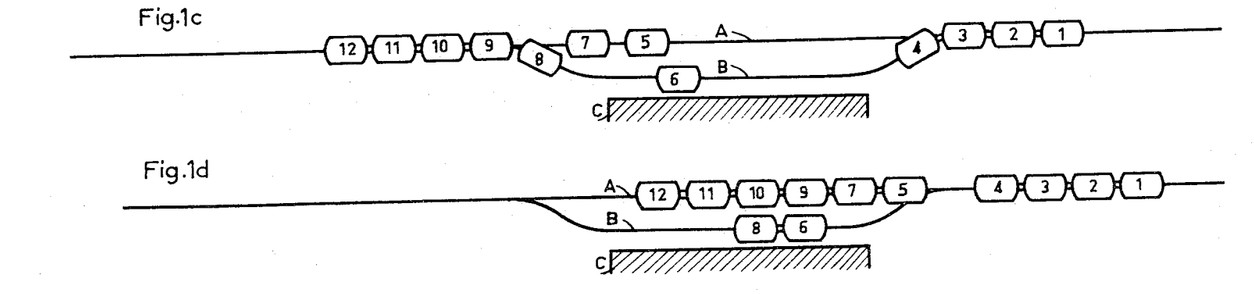

FIG. 1c shows, yet a few more minutes later, train (1, 2, 3, 4) almost out of the station and a second vehicle 8 being switched at the station entrance, while vehicle 6 continues to move along the secondary track and vehicle 5 as slowed down to take up the space separating it from vehicle 7.

Still later, FIG. 1d shows train (1, 2, 3, 4) completely engaged on the main track, vehicles 6 and 8 stopped at the platform and linked together to form a secondary train. In addition, the spaces between vehicles 5, 7 and 9 have been reabsorbed and connections established between these vehicles so as to form a new main train (5, 7, 9, 10, 11, 12).

Figure 1E:
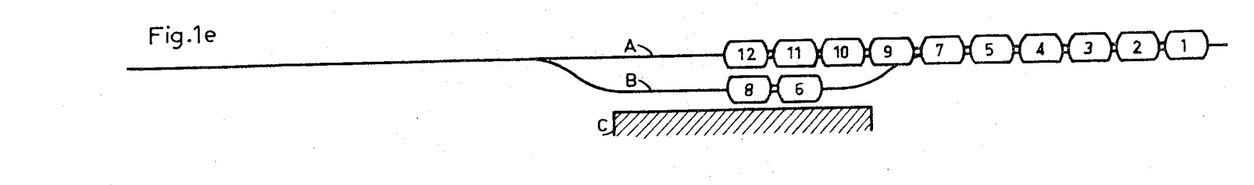

Lastly, FIG. 1e shows the rendezvous between the departing train (1, 2, 3, 4) and the main train (5, 7, 9, 10, 11, 12), so as to form a new main train (1, 2, 3, 4, 5, 7, 9, 10, 11, 12) traveling towards the next station, while train (6, 8) has stopped at the platform for the transfer of passengers or goods.

It can be seen clearly from FIGS. 1a through 1e that vehicles have individual autonomy only during the short period between the moment when they separate from the main train and that when they stop at the platform. The rest of the time, they are made up into trains.

It is this reduction to a strict minimum of the time during which vehicles are autonomous which, although still maintaining each vehicle's flexibility of allocation, enables traffic to be managed to the best advantage, taking into account the fact that, in addition, it is advantageous to make the mian trains follow each other at a fast rhythm.

The allocation of each vehicle to one or more destination stations may be effected in two distinct ways:
— either in accordance with a pre-established program whose orders for execution are registered at the head of the line on each vehicle, as described later. Such a program can be modified only by the person responsible for traffic on the line;
— or by passengers themselves. For this purpose, in accordance with the main patent, they have at their disposal a control and placarding board placed on the outside of the vehicle, with a replica inside the vehicle.

Taking into consideration the relatively high speed of main trains and small size of vehicles, the length of time a vehicle is on a junction is very short. There could therefore be no question of providing standard switching devices operating by deforming the rails, such as railway switches, whose action would be much too slow.

Switching devices will therefore be provided on board the vehicles, co-operating with steering means provided on the track. These devices and means may take the form of different types of embodiments, without exceeding the scope of the invention. As non-limiting examples, two particular embodiments will be described below, one mechanical, the other electromagnetic.

EXAMPLE OF SWITCHING

The switching device, a particular embodiment of which is shown in FIGS. 2 to 5, is fixed to the substructure of a programmed vehicle comprising (FIG. 2) a body 210, seats 211 and 212, and sliding doors 217a and 217b.

Figure 2:
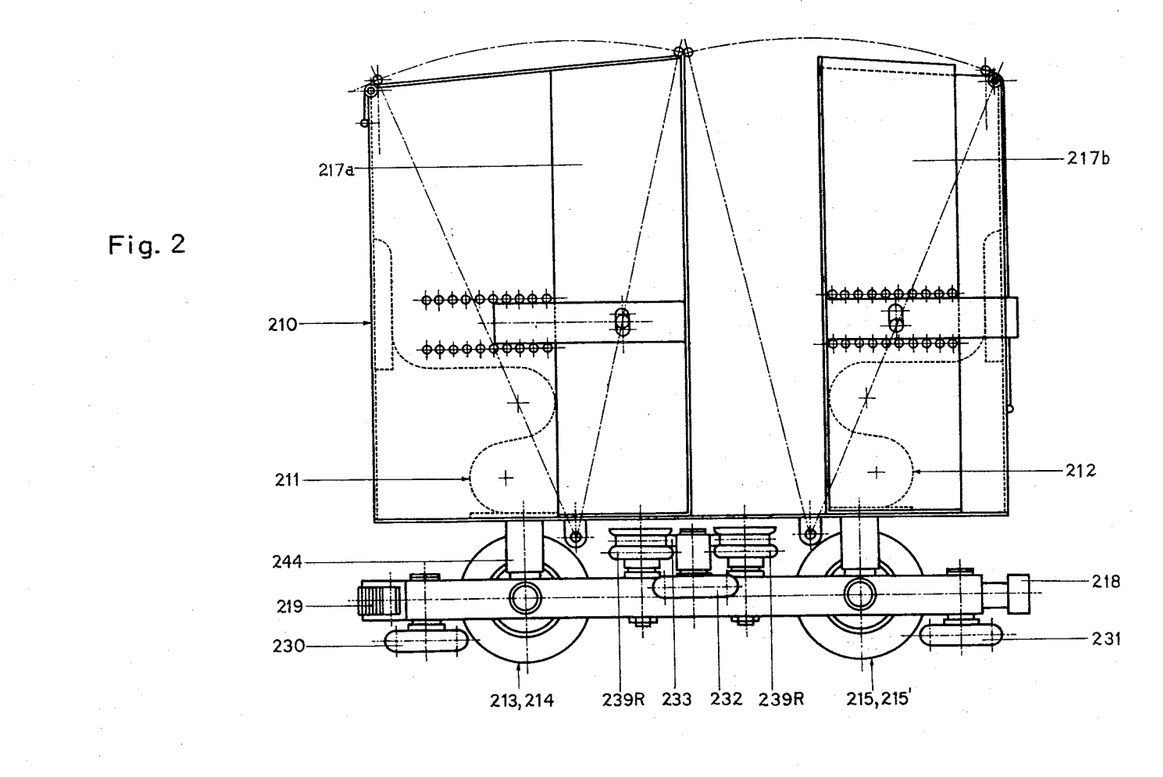
FIG. 2 is a diagrammatic longitudinal section of an installation vehicle.

The substructure comprises two rear wheels 213, 214 and two front wheels 215, 215'; these wheels support the vehicle while wheels 230, 231 situated at the four corners of the vehicle, back and front, guide it and keep it on the track.

Figure 3:
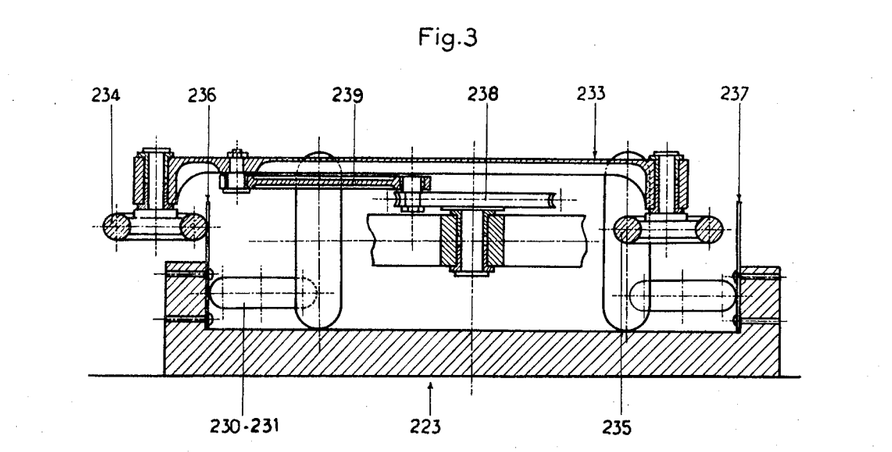
FIG. 3 is a partial cross-section showing the substructure of the vehicle shown in FIG. 2.
Figure 4:
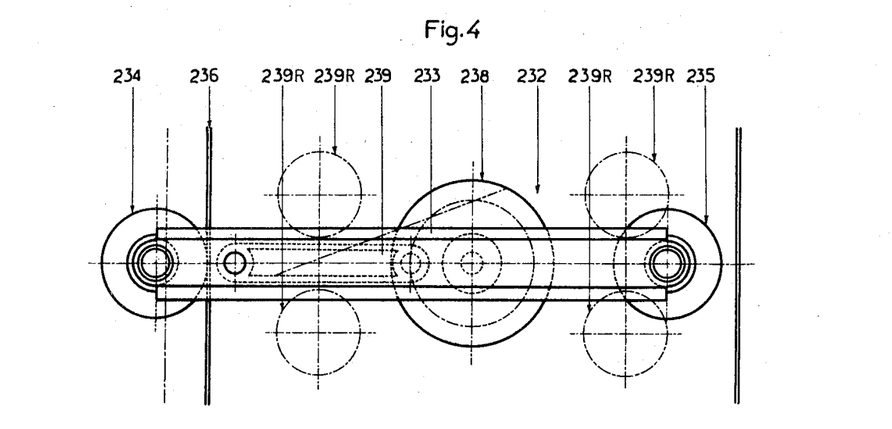
FIG. 4 is a diagrammatic plan view of a mechanical-type switching device on board.

In this embodiment, the switching device 232 shown in FIGS. 3 and 4 comprises a mobile outfit made up of a slide 233 with two rollers 234, 235. The slide 233, which may be moved transversally in relation to the vehicle, allows one of the rollers 234, 235 to be positioned in coupling in relation to the steering component 236, 237 for a deviation. The steering component is a rigid plate, but it may be of another form, termed herein as a steering rail. The steering rail is present only at the turn-out. In the position illustrated in FIGS. 3 and 4, active roller 234 is put in place on the external face of steering component 236 made up of a steel plate. Displacement of slide 233 is controlled by a control disk 238, and a tie-rod 239 connects the disk and the slide. Rotation of disk 238 is ensured by a motor acting on orders it receives from an over-all program or directly from passengers.

The switching device connected to the vehicle comprises in addition rollers 239 for guiding slide 233

DEVIATION BETWEEN A MAIN TRACK AND A TRACK SERVING A STATION

FIG. 3 is a section view of slide 233 at a deviation 233 between the main track and the track serving a station.

The right-hand-side steering component 237 is connected to the right-hand-side track for a right-hand turn-out and the left-hand-side steering component 236 is connected to the left-hand-side track for a left-hand turn-out. The choice of a direction consists of making the corresponding roller co-operate with the steering component connected to this direction.

In the case illustrated in FIGS. 3 and 4, the selected destination is connected to the left-hand-side track. The control order linked to this direction ensures displacement of slide 233 to the left to bring roller 234 to the left or outer side of steering component 236, displacement having been accomplished well in advance of encountering the steering rail at the turn-out. This steering component 236 is in this way caught between roller 234 and wheels 230, 231. The vehicle is thus obliged to follow this steering component 236. On the other hand, as roller 235 is situated inside steering component 237, the vehicle is not obliged to follow steering component 237.

DESCRIPTION OF THE VEHICLE

Figure 5:
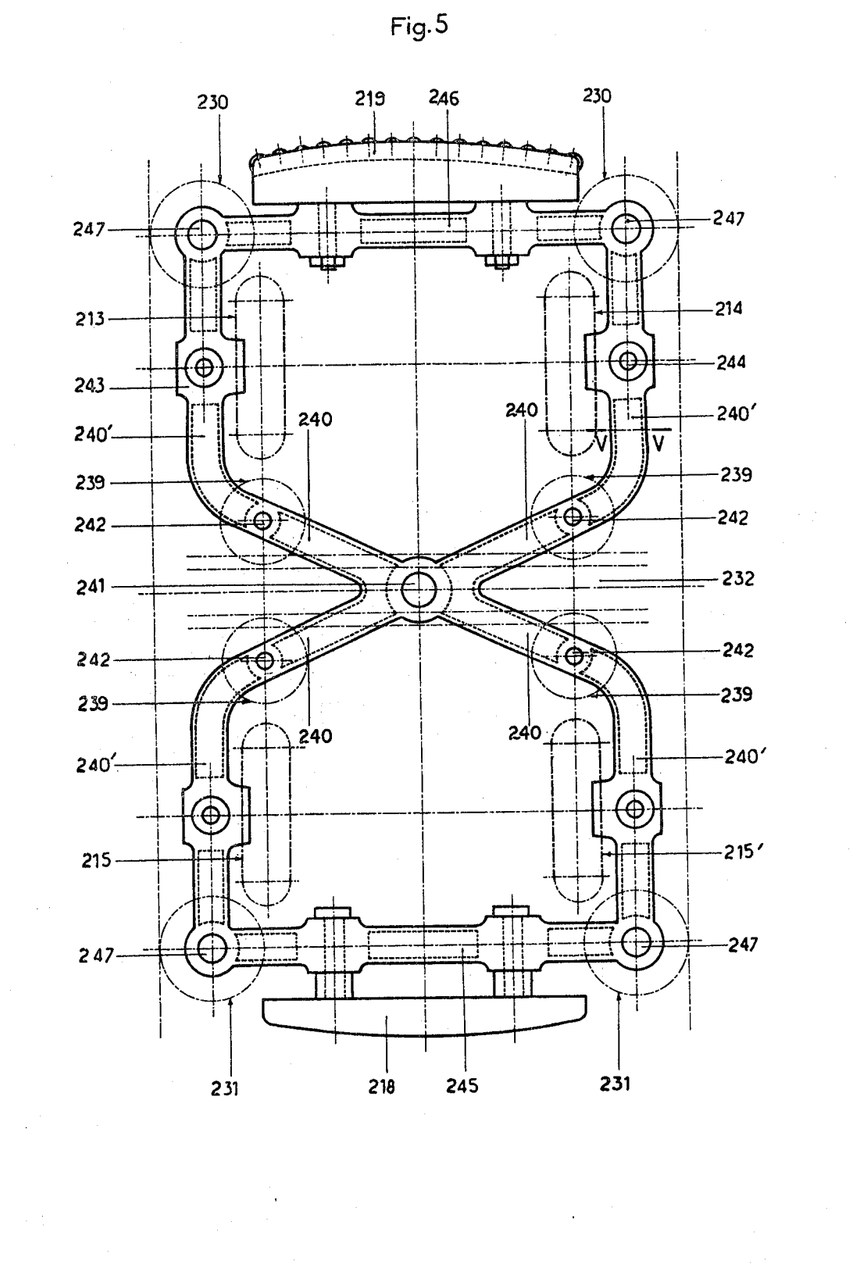
FIG. 5 is a diagrammatic plan view of the chassis of a vehicle corresponding to FIGS. 2 and 3.

A vehicle body, such as illustrated in FIG. 5, is made up of frame-members having the over-all shape of a letter X.

The four arms 240 have a common point 241 which forms the pillow-block for disk 238. The straight ends of these arms 240 also support the pillow-blocks 242 of runners 239 steering the mobile outfit of the switching device 232 shown solely by broken lines in this figure.

Arms 240 end in extensions 240' parallel to the vehicle's major axis. These straight parts 240' each bear a pillow-block 243 for the vehicle's rolling wheels 213, 214, 215 and 215', as well as means of suspension 244 (FIGS. 5 and 2) for the vehicle's body 210.

The ends of straight parts 240' are connected by a front 245 and rear 246 transversal frame-member bearing the fenders and coupling means 218, 219. In addition, the four angles of the body have pillow-blocks 247 and guiding wheels 230 and 231.

The frame-members of the body are basically of inverted U-shaped section. The parts making up the pillow-blocks or receiving fixing or supporting means, either for rolling wheels, guiding wheels or control and switch-guiding wheels, are completely reinforced parts.

In accordance with this invention, the vehicles are very narrow and in section are less than one-quarter of the length or width of an ordinary underground railway. This allows a considerable saving to be made on public works investments to construct an urban transport network on its own ground.

Figure 6:
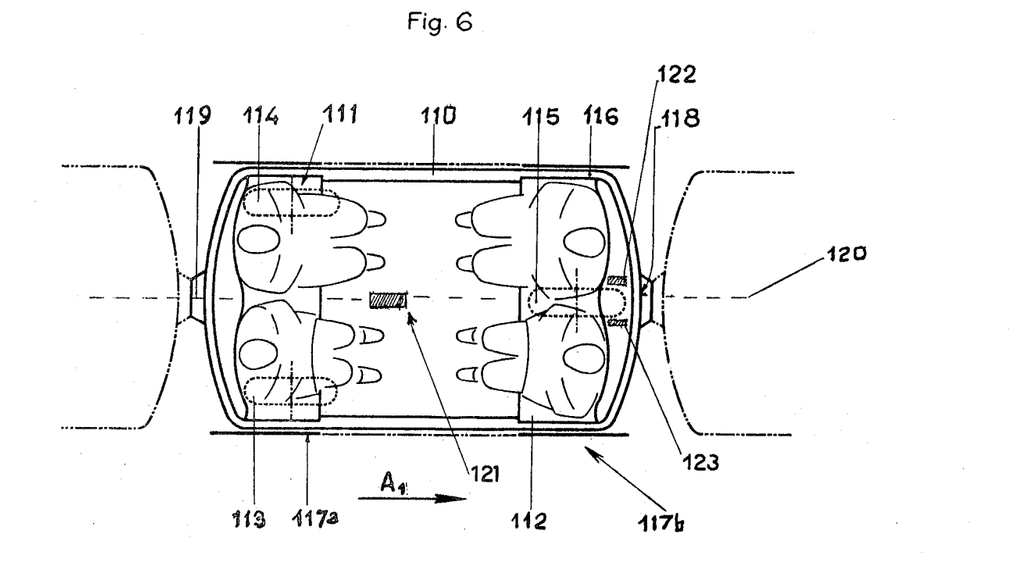
FIG. 6 is a plan view showing the general layout of a vehicle.
Figure 7:
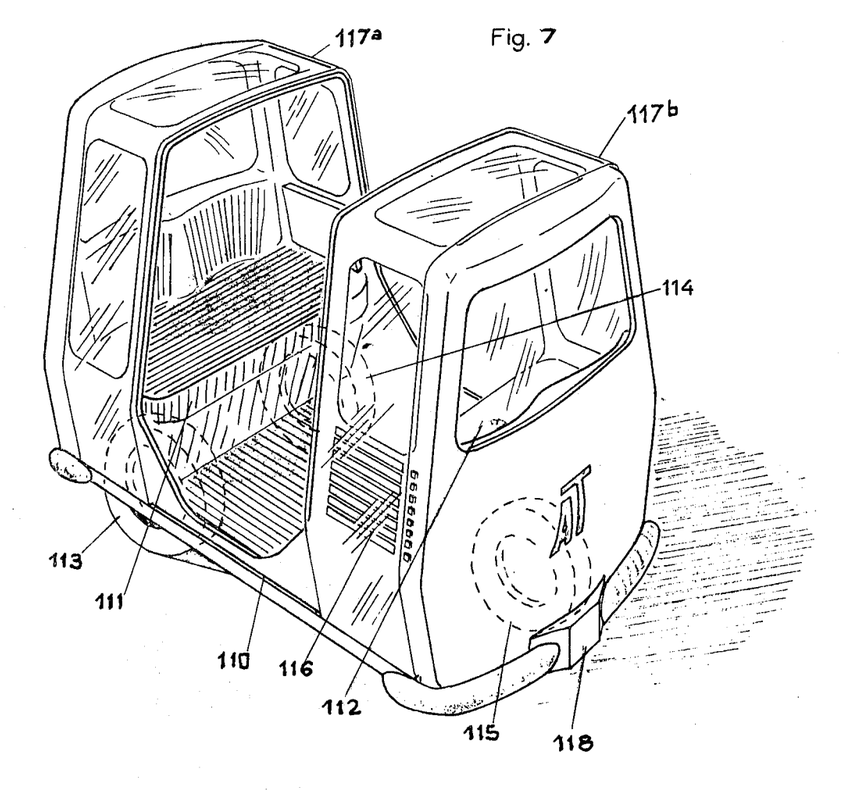
FIG. 7 is a perspective view of a vehicle corresponding to FIG. 6.

FIGS. 6 and 7 show the general outlay of a vehicle in a particular embodiment.

Vehicles are carried by three wheels, 113, 114, 115, having rubber tires: one swivelling front wheel 115 and two fixed direction rear wheels 113, 114.

Vehicles are driven to two continuous current electric rotary motors — one positioned in each rear wheel — controlled by an automatic pilot device. Current is collected by a flange 121 rubbing on a rail 1120 acting as an electricity conductor and positioned on the axis of the track followed by the vehicle which, in addition, is grounded.

The vehicle is equipped with two signal pick-ups 122, 123, positioned left and right in the inductive field created by a high-frequency carrier current superimposed on the traction current circulating in rail 1120. Equal voltages induced into each pick-up establish an operating condition indicating that the vehicle is centered on rail 1120.

To switch the direction of the vheicle, a difference in speed is created between each of the rear wheel motors; the front wheel, which is pushed and self-orientating finds its bearings or directions accordingly. Thus, a pilot control is connected to the pick-ups 122, 123 and tends to modify the speed of one or the other motor until the difference between voltages induced by the high-frequency current passing through rail 1120 into the two steering elements 122 and 123 is approximately.

It should be noted that this plan is conceived with security in mind: if the vheicle tends to move away from its trajectory beyond a Pre-determined limit, flange 121 leaves feed rail 1120 and the vehicle stops; the emergency brake — fed by an accumulator on board — then comes into service. The same brakes are used to immobilize the vehicle if the electric traction or if the steering carrier signal fails current fails.

FUNCTIONING OF THE INSTALLATION

Figure 8:
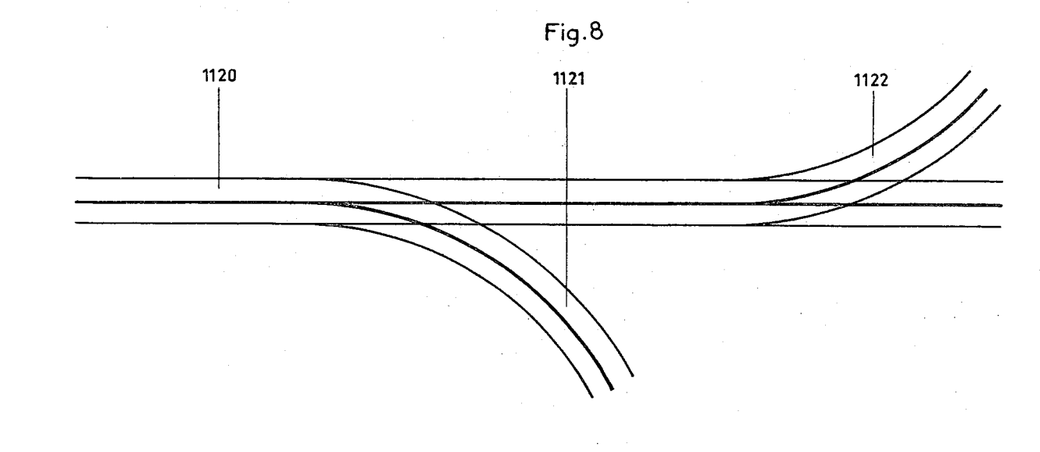
FIG. 8 shows diagrammatically how an electromagnet type steering and switching device functions.

The switching devices are of the electronic type, not requiring any mechanical maneuver on the track or on the vehicle. They are of the pre-selection, instantaneous reply type. They work on the following principle (FIG. 8):

— The high-frequency steering carrier signal, superimposed on the traction current in steering and feed rail 1120 on the main track, as frequency $f_0$; in the first deviation steering and feed rail 1121, the current has frequency $f_1$, and it has frequency $f_2$ in steering rail 1122 of the second deviation, etc. which frequencies are different one from another.

— At the output from steering pick-ups 122, 123, all vehicles have selective circuits adjusted to frequencies $f_0$, $f_1$, $f_2$, etc. To switch a specific vehicle to track 1121, the sective circuit tuned to frequency $f_o$ is opened and, by means of a logical circuit, channel $f_1$ is given priority over channel $f_o$. When the vehicle reaches the switch between the main track 1120 and the first deviation 1121, it receives signals simultaneously on frequencies $f_o$ and $f_1$. As the latter have priority, the vehicle can be switched and steered to follow the secondary or the deviation track 1121 in preference to the main track 1120. The opening of channel $f_1$ on the vehicle is effected well up the line ahead of the switch in the turn-out area similar to pre-positioning slide 233 aforesaid:: either at the head of the line if the system is that whereby vehicles are systematically pre-allocated in accordance with a pre-established program, or when the passenger presses his destination button if allocation is determined by passengers.

In accordance with FIGS. 6 and 7, in the case of passenger transport, each vehicle is fitted with double sliding doors 117a, 117b, preferably of a transparent material and sliding on rails 110. These doors are automatically closed before the vehicle departs and opened after it has stopped in a station.

Figure 9:
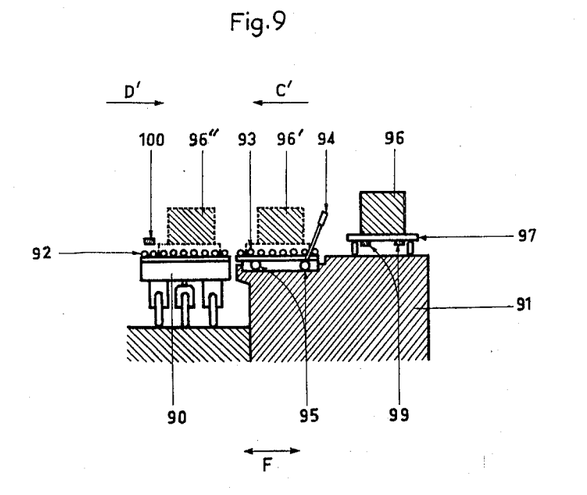
FIG. 9 is a diagrammatic cross-section of a vehicle and the platform alongside which it is standing, showing the roller track devices used for loading and unloading goods.
Figure 10:
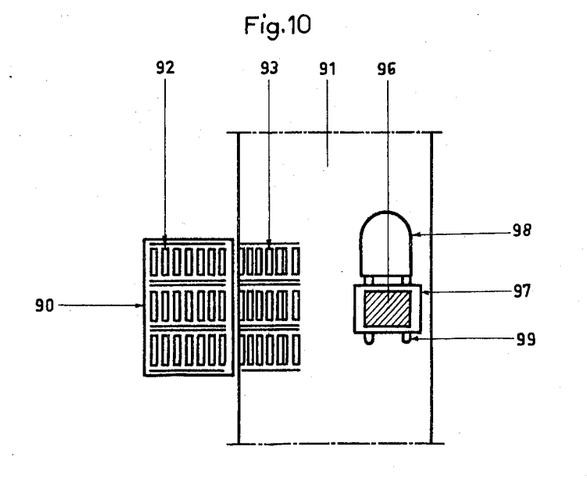
FIG. 10 is a diagrammatic plan view corresponding to FIG. 9.

In the case of goods transport, their loading into vehicles and unloading onto station platforms may be effected automatically. FIGS. 9 and 10 show diagrammatically a particular embodiment of means used for this purpose.

A vehicle 90 is stopped alongside a platform 91. The vehicle foot-plate is equipped with roller tracks 92 whose rollers, lying parallel to the platform, may be driven in rotation by a motor on board the vehicle. This motor may be remote-controlled by pilot circuits described later.

The part of the platform adjacent to the track is fitted with roller tracks 93, similar to roller tracks 92, and whose rollers are orientated in the same way as described above. In addition, these roller tracks 93, under the action of a handling lever 94, may effect, perpendicular to the edge of the platform, a certain horizontal movement C which enables them to be brought into contact with roller tracks 92. Roller tracks 93 are driven in rotation by a motor which is remote-controlled by means of pilot circuits described later.

Goods making up a load 96, preferably resting on a palette 97, are brought along the platform by a left truck 98 with forks 99. In accordance with a known technique, this truck places the palette and load 96 in position 96' on roller tracks 93, whose rollers are at that moment stationary.

On the action of a control signal, the motors driving track rollers 93 and 92 start up so as to displace the load in the direction of arrow C, until it arrives at position 96'', against a stop 100 on the vehicle. Contact with stop 100 then cuts the motors driving the rollers.

Unloading is effected by the reverse procedure, the rollers then being driven so that they move in the direction of arrow D, from position 96'' to position 96', whence the fork lift truck will remove it when required.

Of course, removing the load from position 96', or delivering it in this position, may be envisaged by using known transport methods other than a fork truck lift, these methods even being entirely automatic.

Steering of made-up trains and individual vehicles may, in a specific way, be effected as described above. Four pilot zones should be distinguished.

Figure 11:
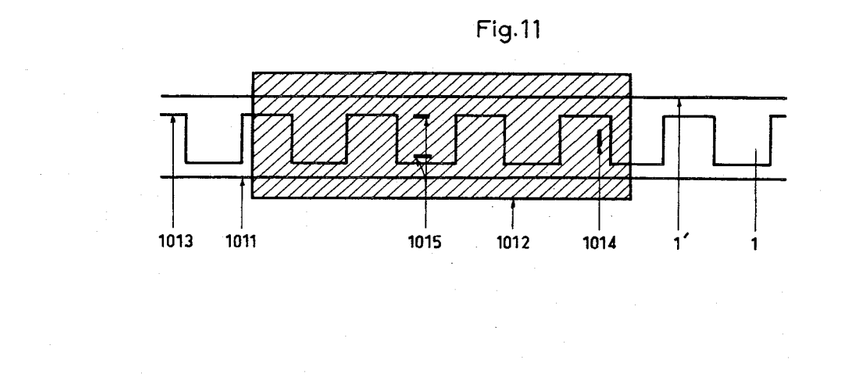
FIG. 11 shows diagrammatically certain steering means connected both to the track and to the vehicles.

PILOTING MADE-UP TRAINS ALONG A STANDARD TRACK (FIG. 11)

Track 1011 is equipped with a Greek key-pattern conductor 1013 acting as transmission a component between vehicles 1012 and automatic devices on the ground.

The latter comprise basically a computer in each station, which controls and monitors trains on sections of standard track between two adjacent half-interstations — up the line and down the line. The automatic device is based on a closed-loop control including a computer, and works as follows:

The vehicles each carry a transmitter 1014 coupled to the transverse wires in the Greek key-pattern conductor and two receivers 1015 couple to the longitudinal wires. When the vheicle passes to the right of a transverse wire, the computer receives an impulse; by calculating the number of impulses received during a unit of time, it determines the speed of the train and by calculating the number of impulses received after the train passes a marker — a fixed reference — it determines the position of the train. These two scales — speed and position — are compared with the running program memorized by the computer. From the differences so measured, the computer works out orders for speed — to cancel these differences — which are transmitted to vehicles via receivers 1015 connected to the longitudinal wires of the Greek key-pattern conductor. These orders are frequency-coded, so that, by their frequency, they are distinguished from signals transmitted by the vehicle (details of speed and position for the computer).

RENDEZVOUS OF TWO TRAINS

This rendezvous occurs systematically, at each station exit, between the train leaving the station, after having stopped there, and a train by-passing the station.

The same conductor network shown in FIG. 11 for transmission between the trains and the fixed automatic devices. Through it, the computer continues to receive permanently details of speed and position of the two trains going to rendezvous. But, while the main train which by passes the station continues to be piloted as described above, namely by comparison with a running program, the train leaving the station is piloted by comparison of its speed and position with those of the main train and, by sending it control orders, to cancel differences in speed and position between the two trains.

REGROUPING OF TRAINS SHORT-CIRCUITING STATIONS

Extraction from the main train of vehicles serving a station creates "gaps" in this train, leading to a splitting-up which is incompatible with the management of made-up trains. It is therefore important to re-form a single train as quickly as possible, i.e., between the two switches: separating up the line from the station and converging down the line.

This train reconstitution is carried out as follows:

When "gaps" have been created, vehicles continue to receive from the automatic pilot orders on speed, so that the movement of the train — if it was complete — complies with the desired running program. In addition, the extraction of a vehicle implies breaking its links with the vehicles in front of and behind it: for example, cutting the electro-magnet excitation — which is effective to couple the vheicles making up the train. Each vehicle is thereby informed when there is a "gap" behind it. When this "gap" is discovered, the vehicle superimposes on the speed instructions received from the station computer, a local braking sub-program: this is a simple sub-program wired up in accordance with a previously-determined fixed rule common to all vehicles. For example, it may be rule for braking at constant deceleration or, better, at deceleration simply modulated in time. This sub-program is only maintained in use for the time time necessary to fill in the gap. As soon as the two vehicles on either side of the gap touch, the corrective sub-program is canceled. Indeed, to prevent impact when the vehicles re-establish contact, they are fitted with proximity sensing device connected to their shock-absorbing bumpers. It is thus the alarm signals transmitted by the proximity sensors which set in motion successive commutations, decreasing in value, of braking deceleration among the two or three possible values of the prewired law and when at the end of their travel change over to a new acceleration order, so that coupling between the two vehicles is effected at closely allied speeds. It should be noted that connection of vehicles wil be confirmed by exciting the coupling electro-magnets again, and that electro-magnetic attractions, at the end of their travel, will help the reconstitution of liaison.

STOPPING OF VEHICLES AT PLATFORMS

All vehicles assigned to a certain station are extracted from the main train at the same point on the track. From this point, therefore, all these vehicles must follow different programs of movement, since the first vehicle must stop at the end of the station platform, the second vehicle must stop behind the first, the third behind the second. During this part of their trajectory, all vehicles continue to receive from the automatic pilot identical orders, as if they were made up into a train, since automatism is only intended for managing made-up trains. In order to obtain proper stopping at platforms, it is therefore important to superimpose on these orders a correcting sub-program which, moreover, varies with the position occupied by the vehicle. This sub-program is simple: it entails an increase in deceleration such that a halt is obtained over a known distance which, moreover, may be identical for all stations. The result is obtained as follows:

All vehicles have on board as many deceleration sub-programs as the number of vehicles envisaged to be stopped in the busiest station. Immediately after the switch point up the line from the station, vehicles pass in front of a marker, in a fixed position on the track, which counts them as they pass and transmits to each of them a code showing the position occupied by the vehicle. These coded signals received by the vehicle set in motion the relevant sub-program commutation.

In accordance with another embodiment, all vehicles carry the same sub-program, this sub-program being commuted to different points along the line. To do this, the line has as many markers — for example, simple friction contacts — as the number of vehicles envisaged to be stopped in the station, these markers being activated successively, one after the other: the passage of the first vehicle past the last marker — the only one active initially — cuts the latter's transmission and starts the following one functioning, etc. Reception by a vehicle of the signal transmitted by the marker — or simply the closing of a contact when the marker is passed — sets in motion the subprogram on board the vehicle under consideration.

Whatever embodiment is envisaged, security when stopping at platforms (no collision) is ensured by two supplementary devices:
— contacts along the platform which actuate, if necessary, an emergency braking system;
— proximity sensors fitted on the collision devices in front of and behind the vehicles.

Although certain specific embodiments of the invention have been shown and described, it is obvious that many modifications thereof are possible. The invention, therefore, is not intended to be restricted to the exact showing of the drawings, and description thereof, but is considered to include reasonable and obvious equivalents.

What is claimed is:

1. In a transportation system characterized by a track system and trains composed of individual vehicles moving along a main track said system including a secondary track having a separate steering rail by which vehicles may be diverted at a left or right hand turn-out from the main track to the secondary track to stop at a station, said secondary track later joining the main track so that diverted vehicles may be re-directed to re-enter the main track to join another train, a slide on the vehicle fitted at opposite ends with opposed coupling rollers respectively engageable with a steering rail accordingly to steer the vehicle at and through a turn-out, each vehicle including selectively operable electric motor means carried thereby to operate the slide and thereby select a steering rail whereby the vehicle may be so diverted through a left or right hand turn-out to follow the selected steering rail to the secondary track, each vehicle having its own propulsion system whereby it may move along the secondary track to the station and after a station stop may be propelled out of the station along the secondary track to join a train on the main track.

* * * * *